US007403952B2

(12) United States Patent
Davis et al.

(10) Patent No.: US 7,403,952 B2
(45) Date of Patent: Jul. 22, 2008

(54) NUMA SYSTEM RESOURCE DESCRIPTORS INCLUDING PERFORMANCE CHARACTERISTICS

(75) Inventors: Brad A. Davis, Lake Oswego, OR (US); L. Christian McDermott, Beaverton, OR (US); Douglas Miller, DuPont, WA (US)

(73) Assignee: International Business Machines Corporation, Armonk, NY (US)

( * ) Notice: Subject to any disclaimer, the term of this patent is extended or adjusted under 35 U.S.C. 154(b) by 1207 days.

(21) Appl. No.: 09/752,861

(22) Filed: Dec. 28, 2000

(65) Prior Publication Data

US 2002/0087652 A1 Jul. 4, 2002

(51) Int. Cl.
*G06F 17/30* (2006.01)
*G06F 15/177* (2006.01)
(52) U.S. Cl. .................. 707/102; 711/103; 711/170; 713/1
(58) Field of Classification Search ............... 707/100, 707/102, 104.1; 709/213, 214; 711/148, 711/170; 713/1
See application file for complete search history.

(56) References Cited

U.S. PATENT DOCUMENTS

| 6,542,926 B2 * | 4/2003 | Zalewski et al. ............ 709/213 |
| 6,549,963 B1 * | 4/2003 | Sayles ........................ 710/104 |
| 6,604,060 B1 * | 8/2003 | Ryan et al. .................. 702/186 |
| 6,701,421 B1 * | 3/2004 | Elnozahy et al. ............ 711/170 |

(Continued)

OTHER PUBLICATIONS

Ang et al., "StarT-Voyager: A Flexible Platform for Exploring Scalable SMP Issues", The International Conference for High Performance Computing and Communications, Oct. 15, 1998.

(Continued)

*Primary Examiner*—Gary J Portka
(74) *Attorney, Agent, or Firm*—Lieberman & Brandsdorfer, LLC (57) ABSTRACT

A method and computer system for efficiently accessing resources in a multiprocessor computer system. Multiple resources are grouped into nodes and system resource descriptors are maintained as data structures. The method incorporates traversing a data structure to efficiently allocate resources within a grouping of nodes. Each node in the system is assigned a node identifying number. This number identifies a node location within a multiprocessor and is used to determine latency between nodes, either through an average latency table or a system interconnect connection table. The data structure comprises secondary data structures therein for storing processor, bus, memory and shared cache information. The data structure includes pointers to each of the secondary data structures. In addition, each node or grouping of nodes may include subnodes. As such, the system provides for a method of recursively accessing additional data structure levels for each level of nodes and/or subnodes in the system. In addition to the data structure and the secondary data structure, the system includes a memory map in the form of a data structure. This data structure stores information as to which node a given block of memory address space is located in. In addition, there is a flag for each memory block indicating whether the memory address is parity or error correcting code (ECC), or neither parity nor ECC protected. This flag is in the form of two bits for indicating the level of memory protection provided to a specific block of memory address. Accordingly, storing the system architecture information in a data structure format provides for an efficient method of accessing system resources and determining latency for specific processes and access patterns.

12 Claims, 11 Drawing Sheets

U.S. PATENT DOCUMENTS 6,816,963 B1 * 11/2004 Krithivas et al. ............... 713/1
6,970,451 B1 * 11/2005 Greenberg et al. .......... 370/352

OTHER PUBLICATIONS

Plaat et al., "Sensitivity of Parallel Applications to Large Differences in Bandwidth and Latency in Two-Layer Interconnects", Institute of Electrical and Electronics Engineers, Inc., 1998.

Kaeli et al., "Performance Analysis on a CC-NUMA Prototype", IBM Journal of Research and Development, vol. 41, No. 3, 1997.

Gamsa, "Region-Oriented Main Memory Management in Shared-Memory NUMA Multiprocessors", University of Toronto, Department of Computer Science, 1992.

* cited by examiner

NUMA SYSTEM RESOURCE DESCRIPTORS INCLUDING PERFORMANCE CHARACTERISTICS

BACKGROUND OF THE INVENTION

1. Technical Field

This invention relates to a multiprocessor computer system and method for enhancing system performance. More specifically, the system provides for efficient allocation of system resources by determining latency between resources.

2. Description of the Prior Art

Multiprocessor systems by definition contain multiple processors, also referred to herein as CPUs, that can execute multiple processes or multiple threads within a single process simultaneously in a manner known as parallel computing. In general, multiprocessor systems execute multiple processes or threads faster than conventional uniprocessor systems that can execute programs sequentially. The actual performance advantage is a function of a number of factors, including the degree to which parts of a multithreaded process and/or multiple distinct processes can be executed in parallel and the architecture of the particular multiprocessor system at hand. The degree to which processes can be executed in parallel depends, in part, on the extent to which they compete for exclusive access to shared memory resources.

The architecture of shared memory multiprocessor systems may be classified by how their memory is physically organized. In distributed shared memory (DSM) machines, the memory is divided into modules physically placed near one or more processors, typically on a processor node. Although all of the memory modules are globally accessible, a processor can access local memory on its node faster than remote memory on other nodes. Because the memory access time differs based on memory location, such systems are also called non-uniform memory access (NUMA) machines. In centralized shared memory machines, on the other hand, the memory is physically in one location. Centralized shared memory computers are called uniform memory access (UMA) machines because the memory is equidistant in time for each of the processors. Both forms of memory organization typically use high-speed caches in conjunction with main memory to reduce execution time.

The use of such architecture to increase performance is not restricted to NUMA machines. For example, a subset of processors in an UMA machine may share a cache. In such an arrangement, even though the memory is equidistant from all processors, data can circulate among the cache-sharing processors faster (i.e., with lower latency) than among the other processors in the machine. Algorithms that enhance the performance of NUMA machines can thus be applied to any multiprocessor system that has a subset of processors with lower latencies. These include not only the noted NUMA and shared-cache machines, but also machines where multiple processors share a set of bus-interface logic as well as machines with interconnects that "fan out" (typically in hierarchical fashion) to the processors.

At boot time, the firmware of a NUMA computer system stores and uses information describing a system's processor, nodes, memory and other devices. However, the firmware does not include information pertaining to the relative proximity of resources within the system. In a multiprocessor computer system, each node may access information and resources from other nodes in the system. However, it is more expensive from a time perspective to acquire information from resources on a remote node than to access resources in the same node. The time required to access resources is known as latency. Accordingly, a method of storing system resource location within the system in conjunction with a method of efficiently accessing such resources is desirable for improving operating efficiency.

SUMMARY OF THE INVENTION

It is therefore an object of the invention to maintain a system resource description as a data structure on a computer system comprising multiple processors. It is a further object of the invention to provide a method of traversing the data structure to evaluate utilization of system resources.

A first aspect of the invention is a multiprocessor computer system including a first descriptor of respective topological levels of at least one of the resources. In addition, a second descriptor of performance of the resources is provided. The first and second descriptors are a first level data structure and a primary data structure, respectively. In addition, each node is assigned a node identifying number for indicating positional placement of a resource in the system. The node identifying number in combination with the descriptors enable ascertainment of average latency between node groups, and specific latency of interconnects.

A second aspect of the invention is an article comprising a computer-readable signal bearing medium, with multiple processors operating in the medium. The article includes resources assigned to node groups, means for determining topological levels of at least some of the resources, and means for determining performance of the resources. The topological level determination means utilizes a data structure in combination with a node identifier for determining positional placement of a resource within a node, and thereby determining placement of the node within the system. The data structure includes a second level data structure for determining performance of a resource. The second level data structure is selected from the group consisting of a processor descriptor, a bus descriptor, a memory descriptor and a shared cache descriptor.

A third aspect of the invention is a method for enabling allocation of resources in a multiprocessor environment. Multiple resources in the multiprocessor are assigned into node groups. In addition, a system resource descriptor is maintained as a data structure. The data structure is traversed to determine costs for accessing different resources in the multiprocessor environment.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

The firmware of a NUMA computer system stores information describing a system's processors, nodes, memory and other devices. In general, the firmware is preprogrammed at the time of booting up the system, and remains static throughout operation of the computer system and any resources therein. In the preferred embodiment of the invention, the firmware of the preferred embodiment is modified from the traditional computer system and is maintained as a data structure, wherein information pertaining to the physical location of individual resources in the system is stored therein. The firmware is dynamic and may be updated during operation of the computer system. The primary object of the modified firmware is to provide insight into the topology and performance of the various resources of the computer system. Such insight enables intelligent decisions regarding placement of workloads with respect to resources thereby enhancing system performance.

Technical Background

Figure 1:
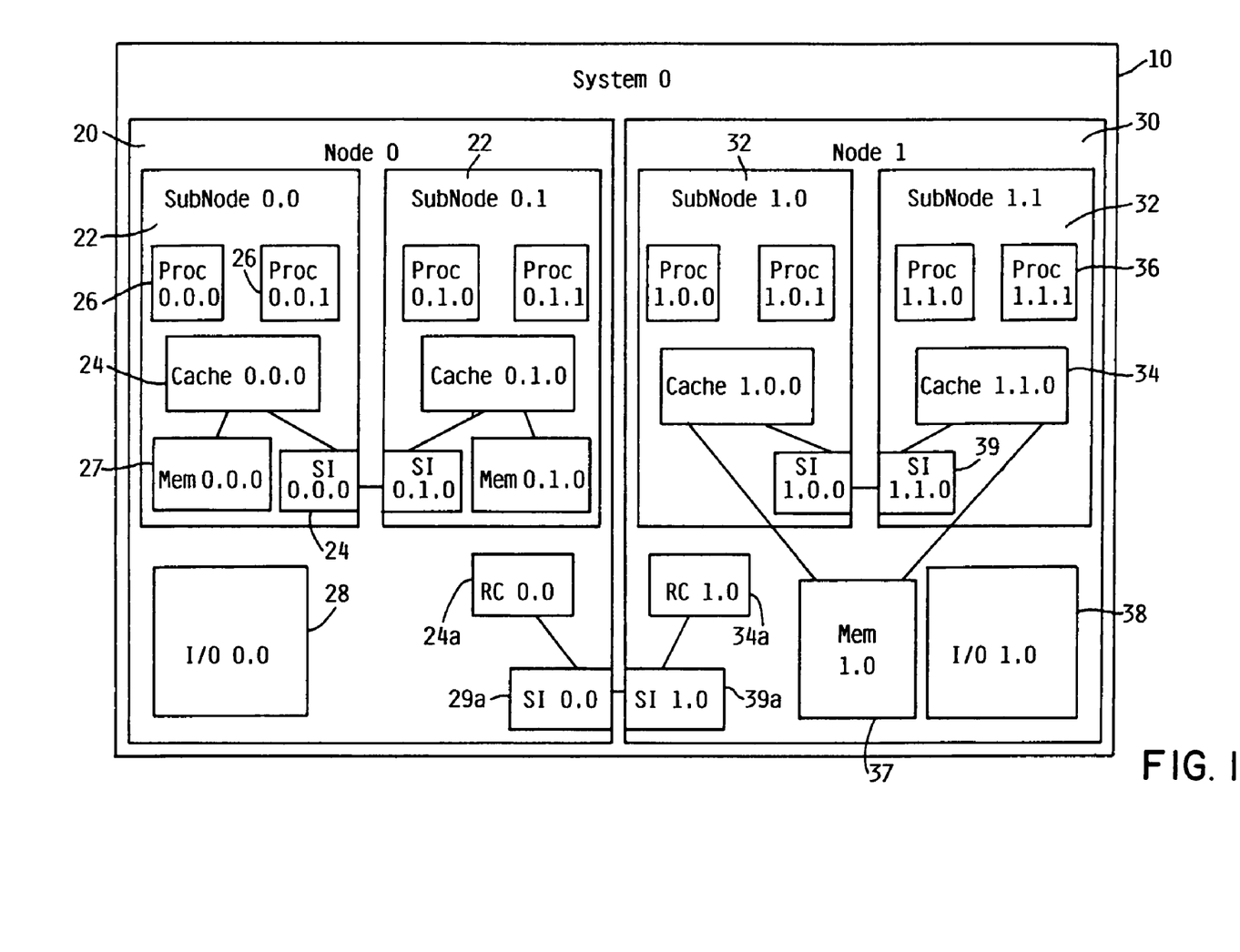
FIG. 1 is a block diagram of a multiprocessor computer system.

As illustrated in FIG. 1, a multiprocessor system 10 is broken down into several physical levels. A DSM multiprocessor computer system is a system in which memory is shared by all processors. All processors can execute different processes concurrently, each with a single thread of control. Within the computer system is a node, or nodes, 20 and 30, respectively. Each node may be further divided into subnodes 22 and 32, respectively. In additional, a plurality of nodes or subnodes may be grouped into partitions. From a hardware perspective, a node is a collection of resources that comprise the fundamental architecturally defined building blocks of a computer system. A node typically contains multiple resources, such as cache 24, 34, processor 26, 36, memory 27, 37, I/O Bus 28, 38, and system interconnect infrastructure 29, 29a, 39, 39a that allows the node to connect to other nodes to form a large scalable computer system. As shown in FIG. 1, each node includes a memory resource 27, or provides for a grouping of subnodes 32 to share access to a memory resource 37. From a software perspective, a node is a data structure that describes the processor 26, 36, bus 28, 38, memory 27, 37, cache 24, 24a, 34, 34a and system interconnect infrastructure 29, 29a, 39, 39a for each hardware building block contained within the system. Nodes may be grouped to form a partition, which is a collection of one or more nodes interconnected together to form a computing environment for an operating system. Multiple partitions can exist within the same computer system. Each partition within a computer system executes a single independent operating system image. A computer system is a collection of nodes or partitions, including service processor hardware, a management console and other infrastructure, representing a single manageable and configurable environment. Accordingly, a system can be split into multiple logical computer systems or partitions, each of which executes a single operating system image.

Memory latency is the dominating factor in well constructed parallel programs. Performance may be estimated by tracking the flow of data among CPUs, caches and memory. For SMP (symmetric multi-processor) and CC-NUMA (cache coherent non-uniform memory access) architectures, this data flow is controlled by the cache coherent protocol, which moves the data in units of cache lines.

Figure 2:
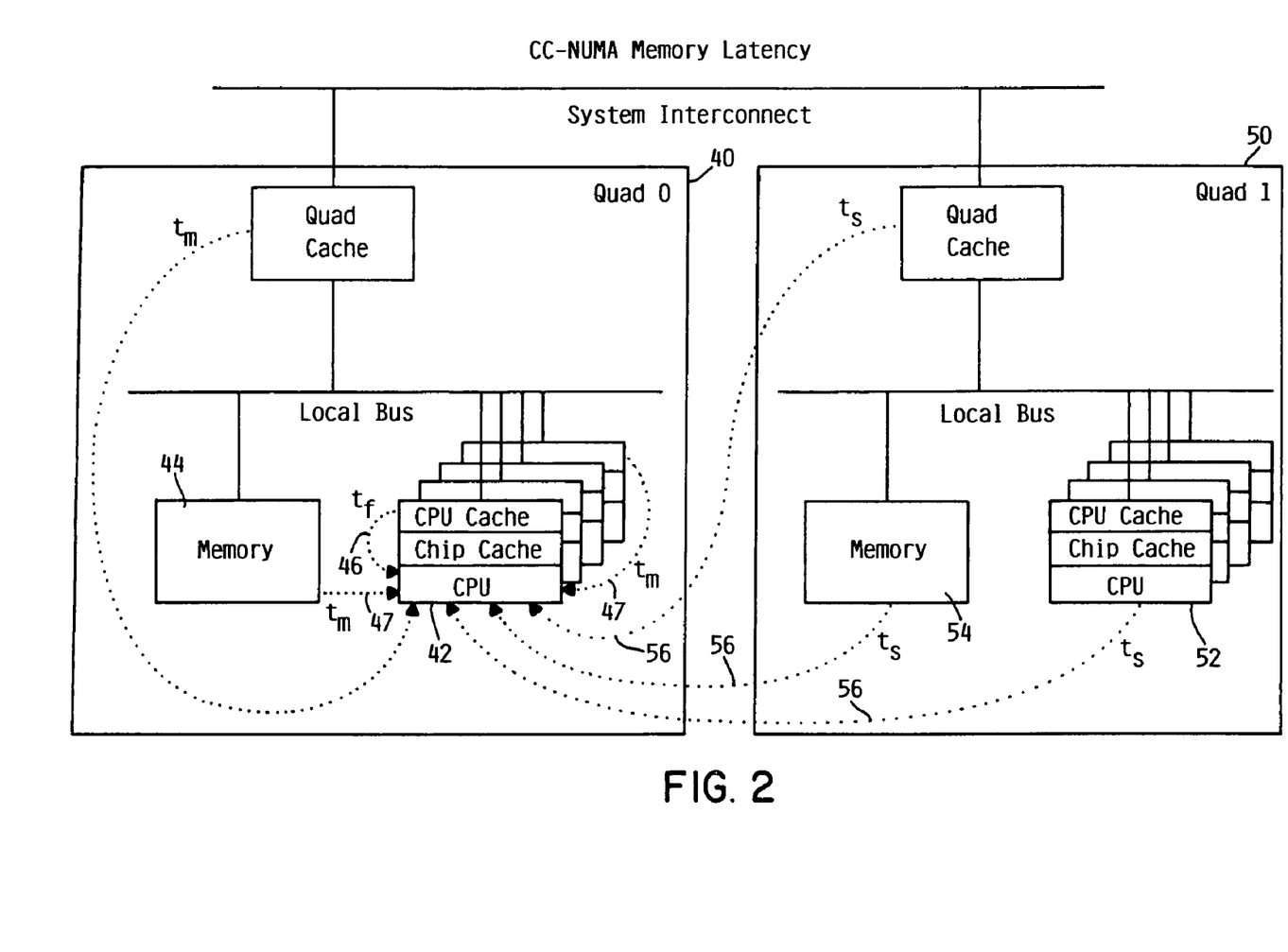
FIG. 2 is block diagram of a multiprocessor computer system illustrating memory latency.

As shown in FIG. 2, a CC-NUMA system is composed of groupings of nodes 40, 50 containing both CPUs 42, 52 and memory 44, 54. Data residing closer to a given CPU will have shorter access latencies. Data that is already in a given CPU's cache may be accessed with latency $t_p$ 46. Data located elsewhere on the same node may be accessed with latency $t_m$, 47, while data located on other nodes may be accessed with latency $t_s$, 56. Once a given data item has been accessed by a CPU, it is cached in that CPU's cache. If the data's home is in some other node's memory, then it will also be cached in the accessing CPU's node's cache. The caching allows subsequent accesses from the same CPU to proceed with much lower latency. Data that has been previously accessed by a given CPU is assumed to reside in that CPU's cache, with access latency $t_p$ 46. Accordingly, the latency of accessing data and resources is dependent upon the location of the resource with respect to the accessing CPU.

The preferred embodiment of the invention comprises a set of data structures for modeling the data paths of a NUMA system. The data structures identify where each resource is located within the system topology. The firmware stores topology information in a data structure instead of coding it within the operating system. Pointers are added to the data structure for addressing additional functions, which are maintained in the form of secondary data structures.

Figure 3:
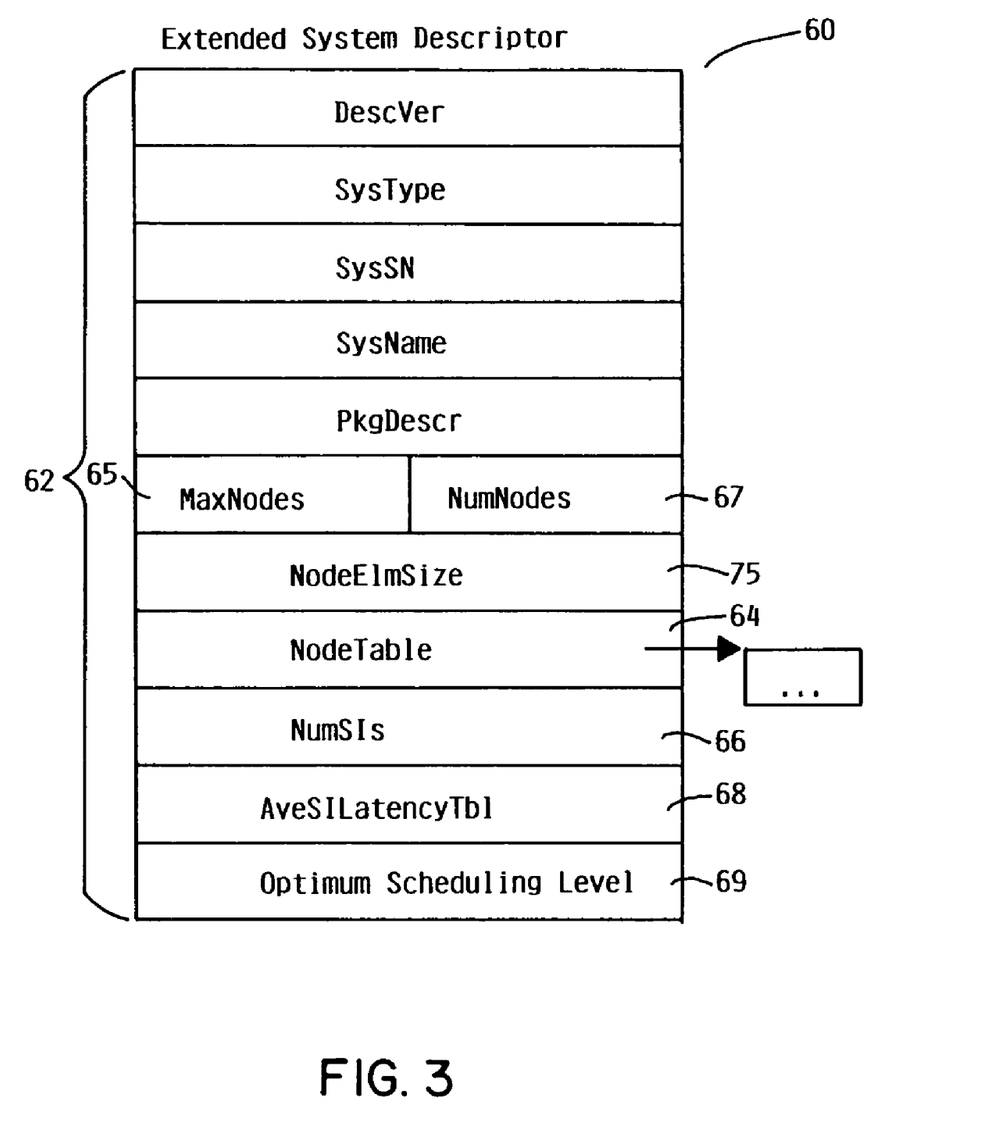
FIG. 3 is a block diagram of a top level data structure of the preferred embodiment.

FIG. 3 shows a top level of the data structure 60, is an extended system descriptor 62. The extended system descriptor 62 maintains information pertaining to the nodes in the system, a pointer to a node descriptor 64, information pertaining to the quantity of system interconnect levels 66, and an average system interconnect latency table 68. The information relating to the nodes in the system includes a maximum possible number of nodes that could be configured for a given platform 65, and the quantity of first level nodes configured 67, and the size of the node descriptor element 75. If both 65 and 67 are zero, this is indicative that the system is not a NUMA system and it does not contain a node structure. This would also be indicative that the quantity of system interconnect levels 66 would be zero as well. The node element size 75 ensures the sizes of the structures are known to ease tree traversal. The quantity of system interconnect levels relates to the different latency levels configured in the system. The average system interconnect latency table 68 is an array of a quantity of system interconnects, where each entry represents an average latency for the respective interconnect level. In a preferred embodiment, the latency is quantified in picoseconds. The array is configured in increasing latency order, wherein the first entry in the table is the lowest level of interconnect and therefor has the lowest latency, and the $n^{th}$ entry in the table is the $n^{th}$ level of interconnect and has the highest latency. In addition, the extended system descriptor 62 contains a field for the optimum scheduling level 69. This field 69 recommends the level within the node architecture for scheduling operating resources. Accordingly, the extended system descriptor 62 is a data structure which stores a primary level of the system or partition layout, and includes pointers to another level of data structures for each node within the system.

Figure 4A:
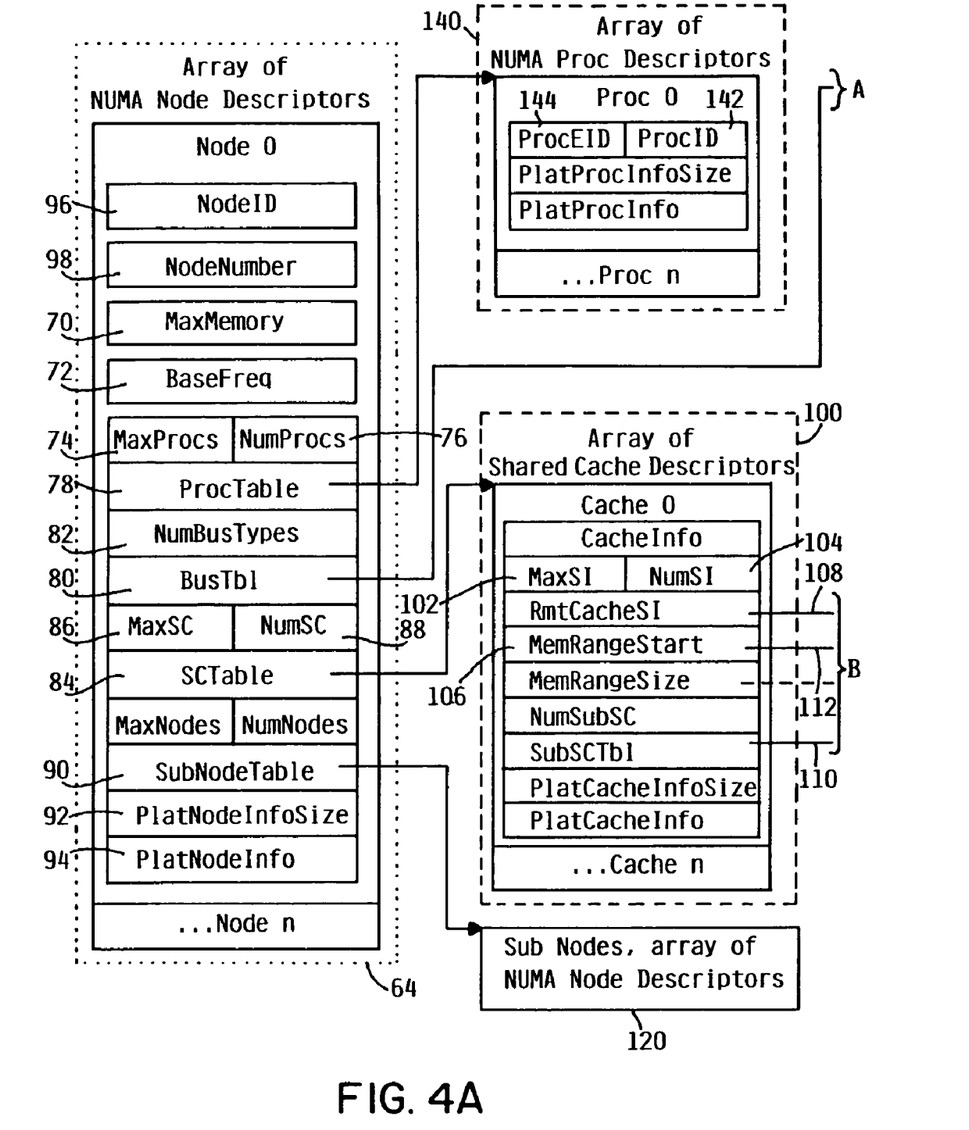
FIG. 4 is a block diagram of a Node Descriptor data structure of the preferred embodiment.
Figure 4B:
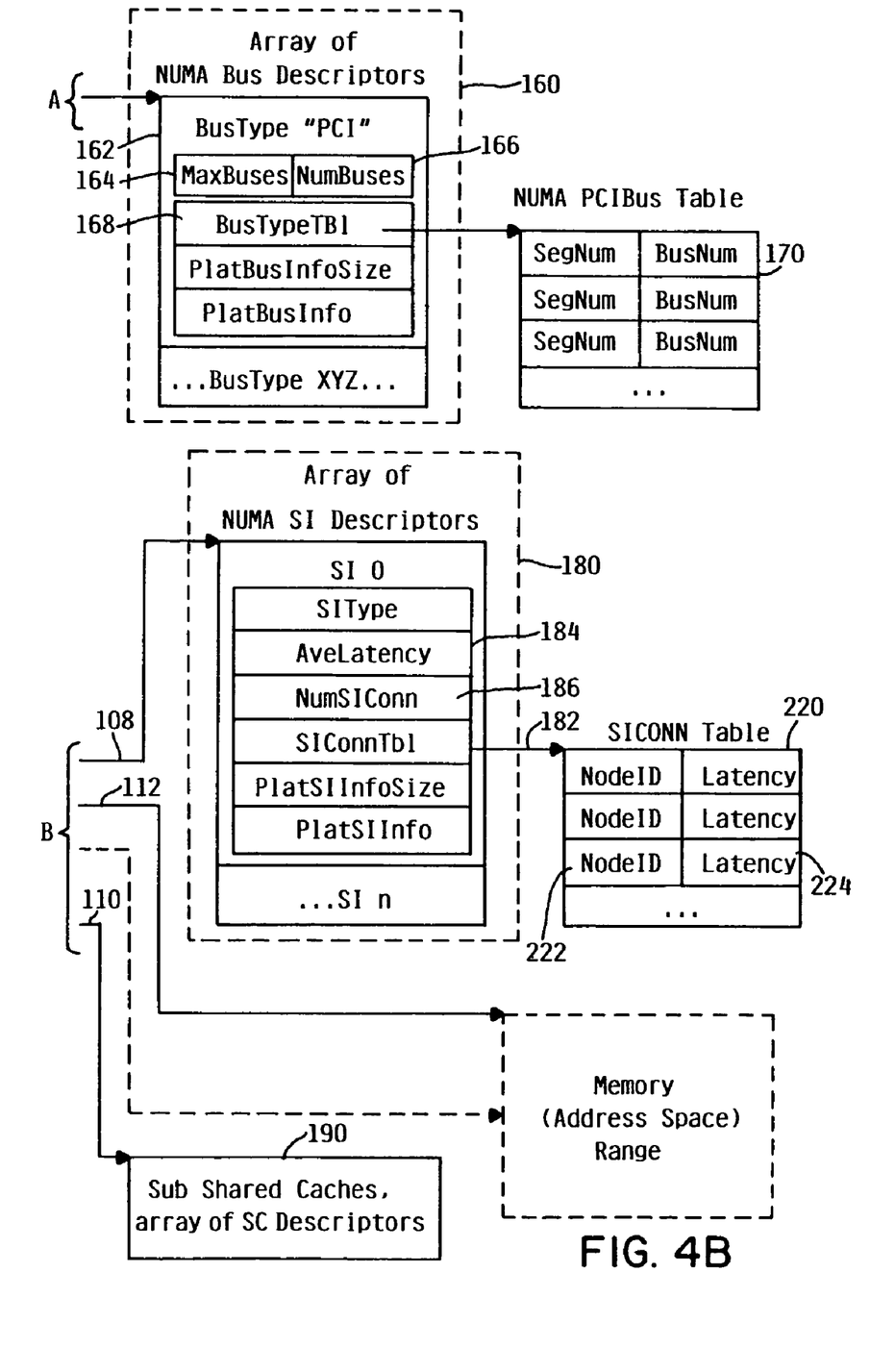

As shown in FIG. 3, the extended system descriptor 62 references a node descriptor data structure 64. An illustration of the node descriptor data structure 64 layout is shown in FIG. 4. The node descriptor data structure 64 includes pointers to several secondary data structures. The secondary data structures, include a processor descriptor 140, a bus descriptor 160, a shared cache descriptor 100, and sub-node descriptor 120. Accordingly, the node descriptor data structure 64 is referenced by the extended system descriptor data structure 62 and further including pointers to an array of secondary data structures.

The node descriptor data structure 64 includes the top level table for each node in the system. Each node in the system is identified by a 64-bit node identifying number 96. The node identifying number 96 is used to identify a specific node from all objects that require node information. The node identifying number 96 identifies the positional placement of a resource within the NUMA topology hierarchy, and enables a context independent access to resources within a node through the NUMA topology. Node identifying numbers may not be unique system wide, however, they are unique identifiers per partition. The node identifying number 96 can be viewed as a node path. It is formed as a string of eight bit octets, where each octet represents a different level of interconnect in the system NUMA topology. Seven levels of system interconnect can be represented by a sixty four bit node identifying number. Accordingly, the value stored in each octet identifies the location or index of a particular node, and thereby identifies all resources contained within that node in its respective table.

The node identifying number 96 is formatted such that the higher order octets represent the higher latency levels of the system topology hierarchy. For example, a system with two levels of system interconnect having four nodes at the subnode level and four nodes at the top level may represent the node identifying number for processors on subnode 2 of node 1 as 1.2.255.255.255.255.255.255. The value "255" represents an unused or undefined interconnect level and the termination point of the particular node path. A resource may be uniquely identified by appending the resource's number within the containing node to the identifier of that containing node, i.e. processor 3 in node 1.2.255.255.255.255.255.255 may be referred to as processor 1.2.3.255.255.255.255.255. Accordingly, the node identifying number represents the path from the highest level of interconnect through the data structure to the node where a particular resource is contained. In addition to the node identifying number 96, the node table data structure 64 includes several fields for storing node related information, as well as pointers to secondary data structures. The NodeNumber field 98 is a numerical value representing the node uniquely within the system. This number is used to identify the node in diagnostic messages and is a separate identifier from the node identifying number 96. The NodeNumber 98 represents a unique physical location identifier system wide, even across boundaries formed by the partitions. The MaxMemory field 70 is the maximum configurable memory size for the specific node. The MaxMemory field 70 value is stored in bytes. The BaseFrequency field 72 stores the base frequency of the node hardware in Hz, i.e. ticks per second. The MaxProcs field 74 identifies the maximum number of processors supported by this particular node. The NumProcs field 76 identifies the number of entries in the processor descriptor data structure 140. The ProcTable field 78 is actually a pointer to a secondary data structure 140 for the processors in each node. The BusTable field 80 is a pointer to a secondary data structure 160 for the buses in each node. The NumBusTypes field 82 corresponds to the BusTable field 80 in that it stores information for the number of the entries in the secondary data structure 160. The SCTable field 84 is a pointer to a secondary data structure 100 for the shared cache in each node. The MaxSC field 86 and the NumSC field 88 related to the Shared Cache data structure 100. The MaxSC field 86 identifies the maximum number of shared caches supported by a particular node, and the NumSC field 88 identifies the number of entries in the associated secondary data structure 100. The SubNodeTable field 90 is a pointer to a secondary level of the primary data structure of the Node Descriptor data structure 64. As such, if there are nodes and subnodes therein, the SubNode Table data structure 120 would store information pertaining to the subnodes in the same manner and architecture of the Node Descriptor data structure 64 for the nodes. Accordingly, the Node Descriptor data structure 64 stores and indexes information pertaining to each node in the system, as well as contains pointers to secondary data structures supported in node related objects.

As noted above, the node descriptor data structure 64 includes several pointers to secondary data structures 100, 120, 140, and 160 respectively. As shown in FIG. 1, each node is comprised of processors, buses and shared cache. Each of these resources represented by the respective secondary data structures occur in any node. In addition, the preferred embodiment of the invention includes a memory map data structure 200, which lies external to the node descriptor data structure 64 and the extended system descriptor 62.

Figure 6A:
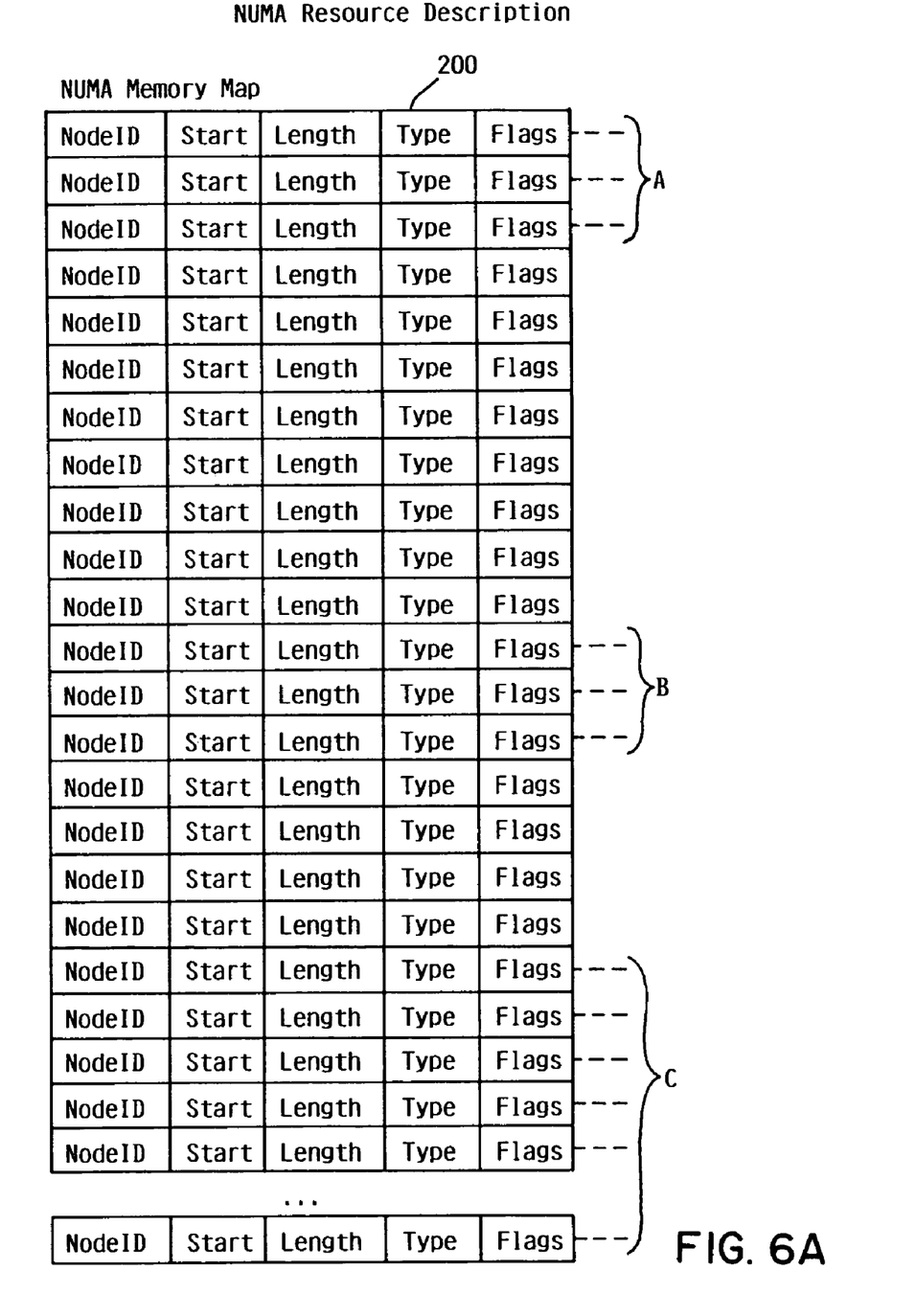
FIG. 6 is a block diagram of the layout of the data structures according to the preferred embodiment of this invention, and is suggested for printing on the first page of the issued patent.
Figure 6B:
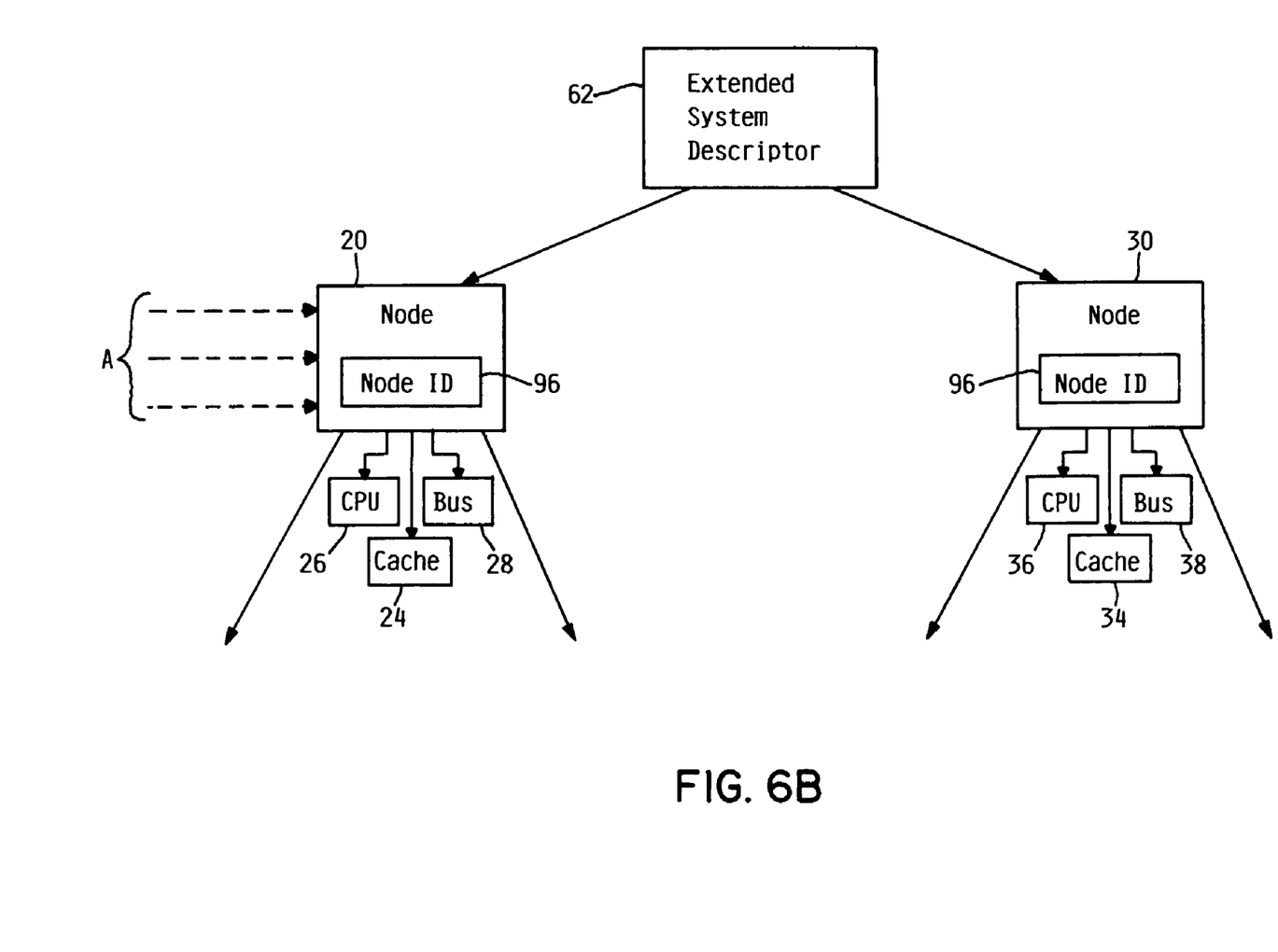
Figure 6C:
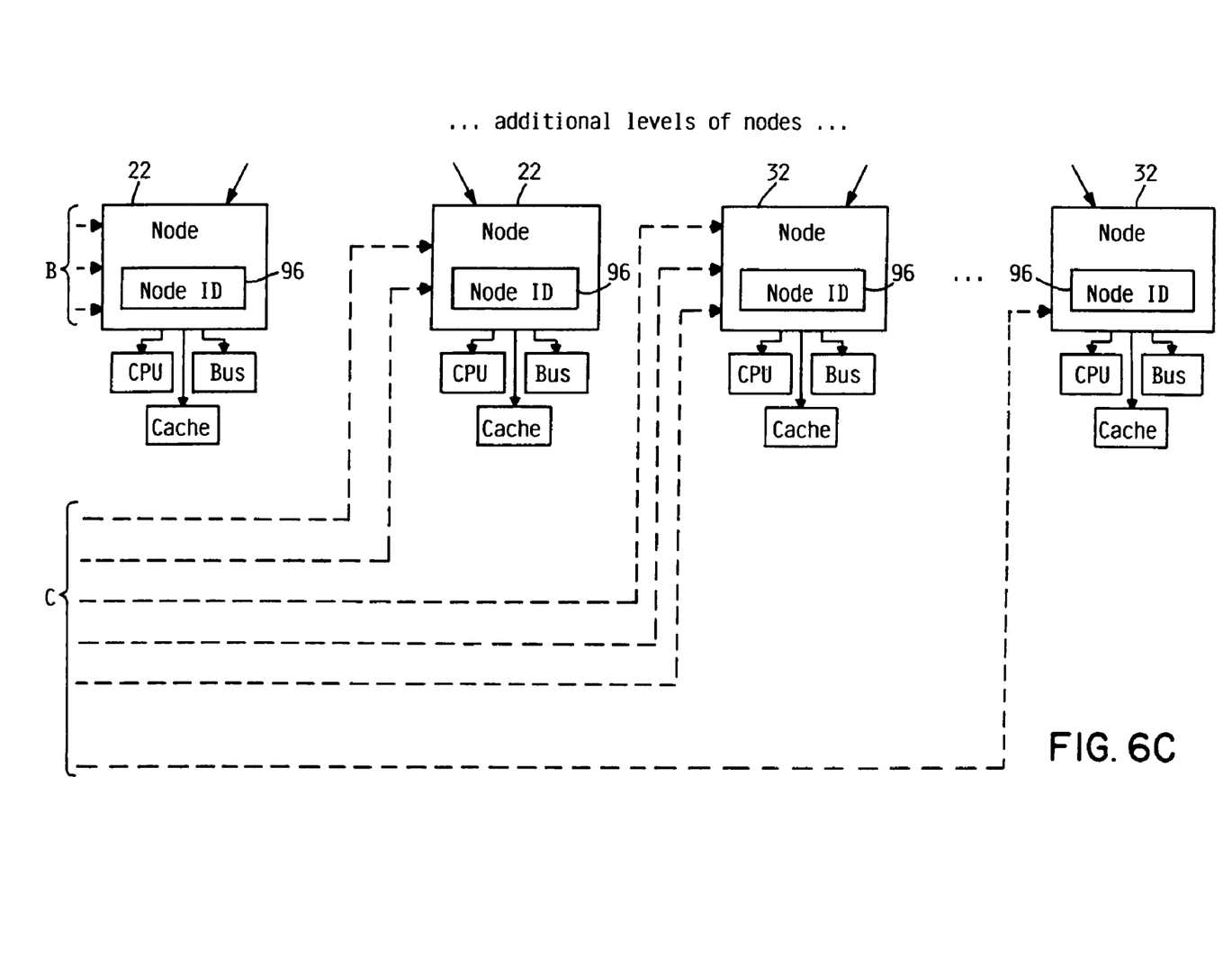

An illustration of the relationship between the data structures described herein is shown in FIG. 6. The extended system descriptor 62 is the primary data structure over the physical layout of the nodes in the system, and includes a pointer to the node descriptor data structure 64, which in turn includes pointers to another level of data structures representing each of the resources on a node. The memory map 200 references the memory block for each node.

Figure 5:
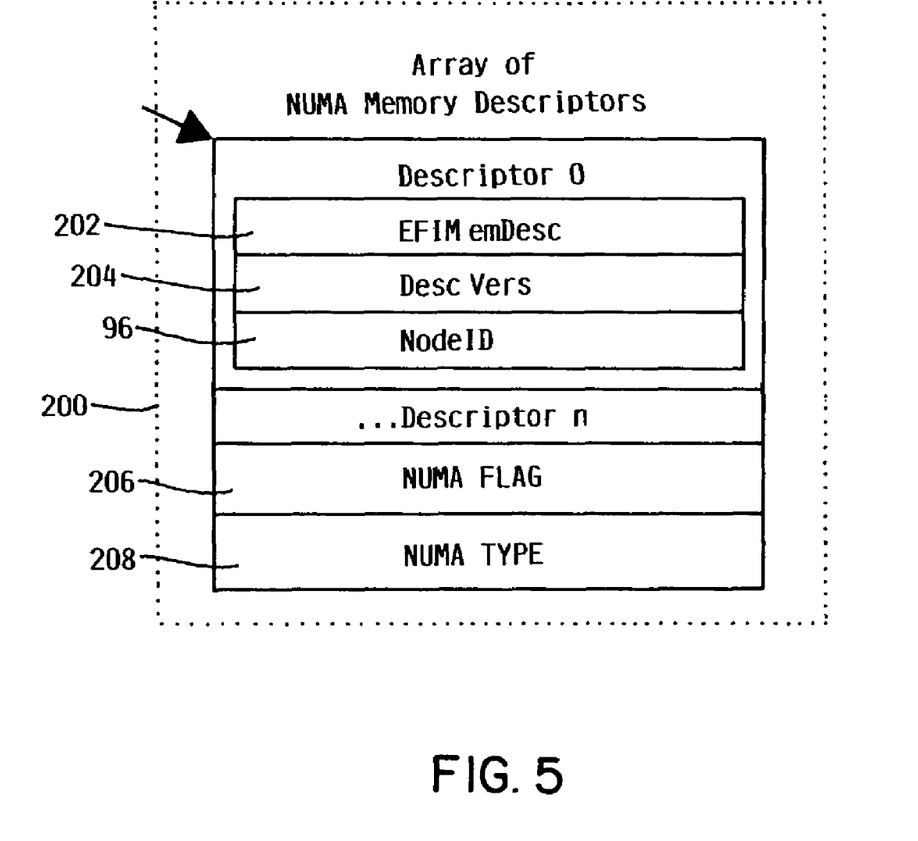
FIG. 5 is a block diagram of a Memory Map data structure.

A detailed illustration of the memory map data structure 200 is illustrated in FIG. 5. The memory map data structure 200 is provided for each node in the partition. The data structure 200 contains several fields relating to where the memory for a specific node is stored. The EFIMemDes 202 field contains information relating to the base address where the memory starts and the length of the memory. The DescVers 204 describes the data structure version. If new resources had to be added to the system, this field interprets other version of the data structure and data stored therein. The node identifying number field 96 is the resource path representing the node which contains this memory, and has been discussed in more detail above. The NUMA Flag field 206 contains two performance related bits pertaining to whether the memory is parity, error correcting code memory (ECC), or neither. The first bit with a value of "1" indicates that the memory is parity, and the second bit with a value of "1" indicates that the memory is ECC. The parity checked memory can detect errors in the memory, but cannot correct the errors, whereas the ECC memory can self correct errors in the memory. High end servers are usually ECC, whereas low end servers would have only parity memory. Finally, data structure 200 contains a NumaType field 208 which describes whether the memory range refers to ordinary general purpose memory, special memory, or hardware. Accordingly, as shown in FIG. 6 each node and subnode within the system is linked to the memory map data structure 200, wherein there can be multiple memory map data structures per node.

The processor descriptor data structure 140 stores information regarding each of the processors in each node. The Proc_ID field 142 and the Proc_EID field 144 together form a partition-wide unique processor identifier. Accordingly, these fields 142 and 144 identify each processor within the node.

The bus descriptor data structure 160 stores information regarding all buses of a specific type in a particular node. There are potentially more than one bus descriptor data structures per node because there can be more than one type of bus per node. The BusType 162 identifies the specific bus type supported by this data structure. The MaxBuses field 164 identifies the maximum number of buses per node of this type supported by this node's platform type. The NumBuses field 166 identifies the quantity of buses currently installed as well as the quantity of additional buses that could be installed later. The BusType table field 168 is a pointer to a BusType table 170 for the bus type being described. The BusType table 170 describes the individual buses within the type. Each of the buses in the system are numbered. However, in a preferred embodiment, this numbering is sparse such that the numbers may be sequential, but not consecutive. This allows for buses to be installed during system operation without renumbering. Accordingly, the Bus Descriptor data structure 160 identifies each bus in a particular node, wherein there may be multiple bus descriptor data structures in each node.

The shared cache data structure 100 identifies information pertaining to the relationships between cache shared by multiple processors. This data structure maintains memory information. The MaxSI field 102 maintains the maximum quantity of system interconnects, and the NumSI field 104 maintains the actual quantity of system interconnects. The AddrRangeStart field 106 stores the physical address space of the start of the memory range to which this cache is cached. The AddrRangeSize field 114 stores the size in bytes of the memory address space range to which this cache is cached. The shared cache data structure 100 also includes pointers 108 and 110 to additional data structures, including a System Interconnect data structure 180 and a sub shared cache data structure 190, and in a preferred embodiment the shared cache data structure 100 includes a pointer 112 to the memory map 200. The sub shared cache data structure 190 is another tree mirroring the shared cache data structure 100 at another level. The shared cache data structure 100 is a recursive data structure which can have multiple levels, wherein each level can have equivalent complexity to the parent level. Accordingly, the shared cache descriptor identifies information pertaining to the relationships between cache shared by multiple processors and memory within a node, remote cache and systems interconnects to other nodes, as well as the possibility of a shared cache backing other caches.

As noted above, the shared cache data structure 100 contains a pointer 108 to a systems interconnect data structure 180. The systems interconnect data structure 180 defines the latency between nodes at the same system interconnect level. A system interconnect connection table 220 is implemented to link nodes in the system together. More specifically, the systems interconnect table is used to define the latency between nodes, i.e. the cost of communicating between nodes. This performance information regarding latency is provided in three different ways:

1. Providing a table storing average latency information for each level of system interconnect within the NUMA topology. (This is a fast and less accurate method of determining latency between two resources in the system). This table is stored in the extended system descriptor 62;
2. Including an average latency field, (AveLatency 184) within a system interconnect descriptor 180 for defining a typical latency between any node sharing the same parent. This method provides a more accurate method for determining latency, however, it is more complex because NUMA topology hierarchy may need to be traversed to determine latency information for resources at different levels; and
3. A System Interconnect data structure 180 which includes a pointer 182 to a connection table 220 which describes the latency from the source node.

Information pertaining to system interconnectivity is stored in a data structure 180. The relationship between the system interconnectivity data structure 180 and the system interconnect connection table 220 are shown in FIG. 4. The system interconnectivity data structure maintains information including an average latency field 184 for defining the typical latency between nodes or subnodes at a particular level, i.e. between nodes sharing the same parent node or system. In addition, the system interconnect data structure 180 maintains information pertaining to the number of node connections 186. If it is indicated that this value is zero, then all nodes sharing the same parent node are assumed to be connected to each other. Accordingly, the system interconnect data structure 180 maintains information pertaining to the quantity of nodes in the system at each level of interconnect.

Within the system interconnect data structure 180 is a pointer 182 to a systems interconnect connection table 220. This table provides specific latency for specific nodes, i.e. measures latency from the containing node to each other node in the system. The table 220 includes two fields, a Target NodeID field 222 and a latency field 224. The Target NodeID field 222 is the same node identifying number 96 of the node descriptor data structure 64. This value represents the eight octet identifier. The latency field 224 stores data containing the specific latency in picoseconds between this node and a target node. Accordingly, the table 220 measures latency to each node in the system and supplies local information when possible, or remote resource information and the associated cost.

Figure 7A:
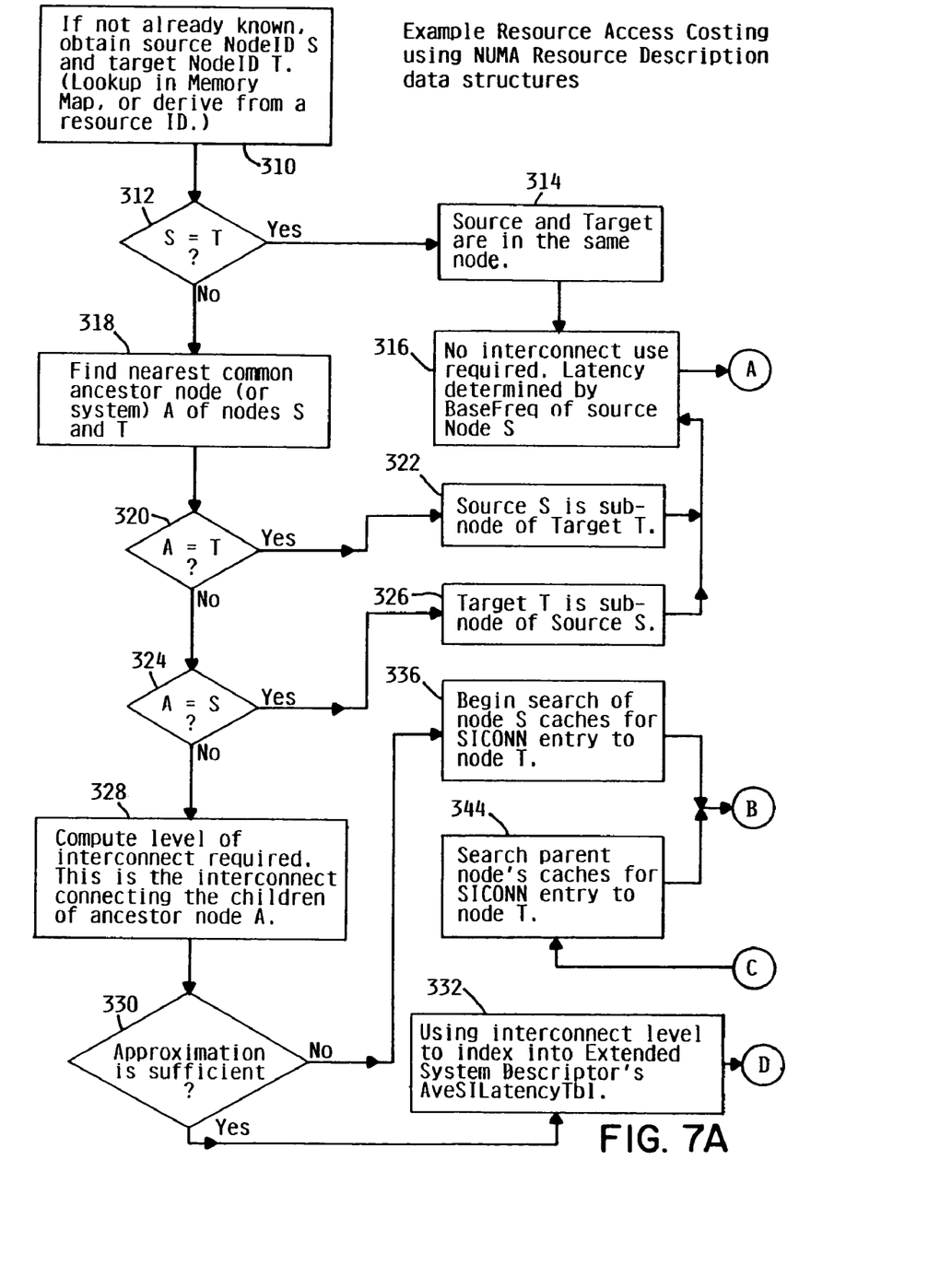
FIG. 7 is a flow chart illustrating resource accessing cost.
Figure 7B:
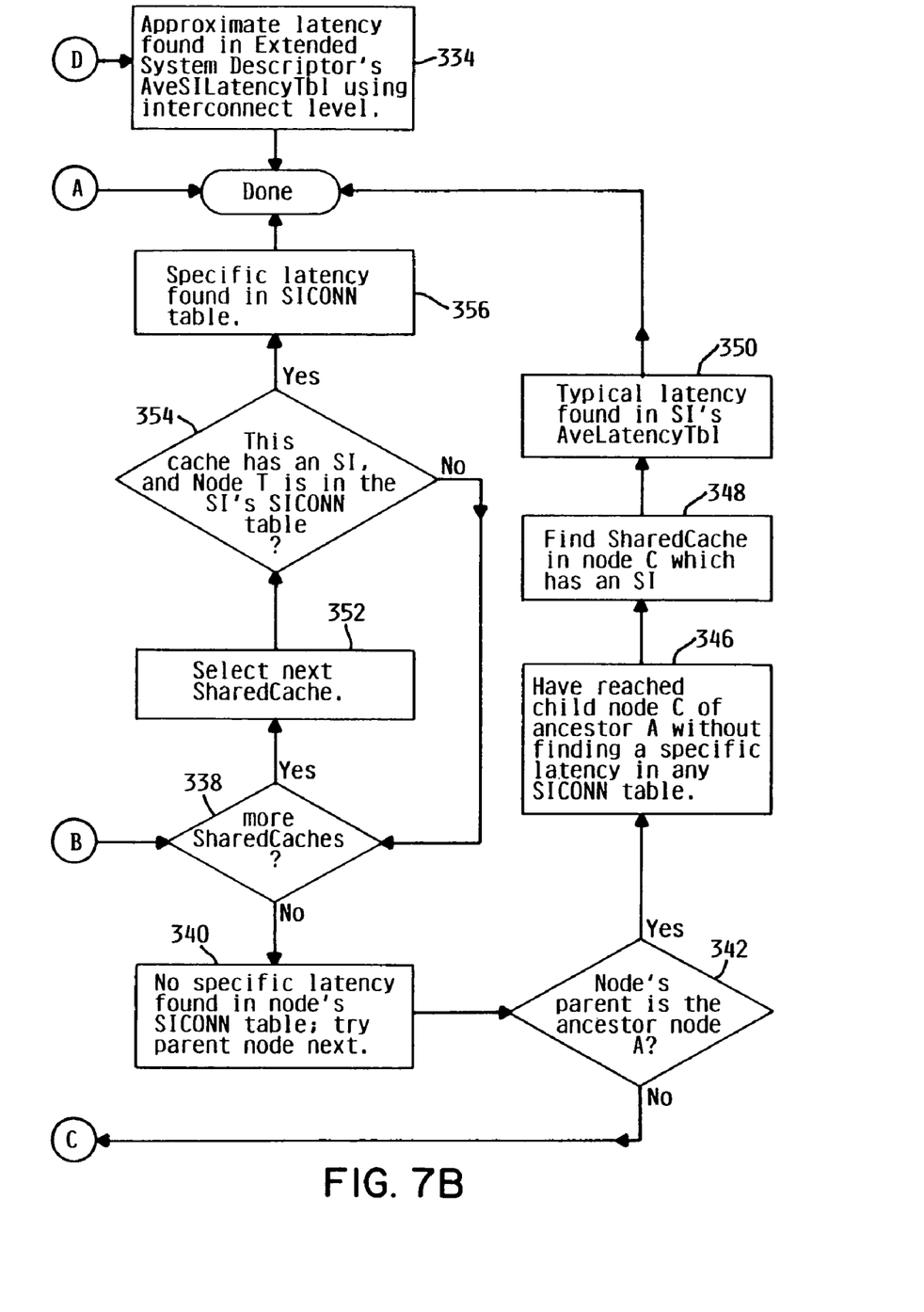

FIG. 7 is a flow chart 300 illustrating a process of determining costs for accessing different resources in the computer system utilizing the data structures discussed above. The first step in ascertaining access cost is to obtain the node identifying number 96 for the source node and for the target node 310. This may be found in the memory map or derived from a resource identification. Next it must be determined if the source node identifying number and the target node identifying number are the same 312. If the source node identifying number is equivalent to the target node identifying number, then the source and the target are in the same node 314, and no interconnect use is required. Latency between the source node and the target node can be determined by the base frequency of the source node 316. Accordingly, if the source node identifying number and the target node identifying number are the same, there is no need to access either the average latency table of the system interconnect connection table.

However, if it is determined at 312 that the source node identifying number and the target node identifying number are not equivalent, the nearest common ancestor node of both the source and target nodes needs to be found 318, and determined if the ancestor node identifying number is equivalent to the target node identifying number 320. If the ancestor node identifying number is equivalent to the target node identifying number, then the source is a subnode of the target node 322. However, if the ancestor node identifying number is not equivalent to the target node identifying number, then it must be determined if the ancestor node identifying number is equivalent to the source node identifying number 324. If the ancestor node identifying number is equal to the target node identifying number then no interconnect use is required. Latency between the source node and the target node can be determined by the base frequency of the source node 316. If at 324 it is determined that the ancestor node identifying number is not equivalent to the source identifying number, then the level of interconnect must be computed to determine the connection of the children nodes to the ancestor node 328.

It must also be determined if an approximation of the cost is sufficient or if a more detailed determination of cost is required 330. Accordingly, upon determining that the ancestor node identifying number is not equivalent to the source node identifying number, then a computation must be conducted to determine the level of interconnect and the latency for accessing the resource.

If an approximation of the cost is sufficient, the interconnect level is used to index into the extended system descriptor's average latency table 332. The approximate latency is found and the latency of access for the source and the target is ascertained 334. However, if an approximation of the cost is not sufficient, then a search is initiated of the source node caches for the system interconnect connection table entry to the target node 336. Next, a determination is made to see if there are more shared caches 338. If at 338 there are additional shared caches, then the next shared cache is selected 352. It is then determined if this shared cache has a system interconnect and the target node identifier is in the system interconnect connection table 354. If the solution to the query at 354 is negative, the routine returns to 338 to determine if there are additional shared caches. However, if the solution to the query at 354 is positive, then the specific latency for the resource is found in the system interconnect connection table 356. If at 338 it is determined that there are no more shared caches, then no specific latency is found in the system interconnect connection table 340, the parent node is searched subsequently and it must be determined if the node's parent is the ancestor node 342. If the answer to 342 is negative, the parent node's caches are searched in the system interconnect connection table to the target node 344, and it must then be determined if there are more shared caches 338. However, if at 342 the answer to the query is positive, then the child node of the ancestor node has been reached without finding a specific latency in the system interconnect connection table 346. The shared cache in the child node which has a system interconnect is found 348, and a typical latency in the system descriptor average latency table is found 350. If it is determined that an approximate cost of accessing the resource is not sufficient, the system interconnect connection table may have to be utilized. Accordingly, the process disclosed herein outlines the possible steps involved in determining costs for accessing resources in the multiprocessor computer system discussed above.

Advantages Over the Prior Art

In general, the preferred embodiment of the present invention requires less time to access resources among nodes. The firmware herein is a data structure containing information pertaining to the layout and topology of the computer system and the resources therein. Topological information pertaining to each node in the system is stored in the database. Furthermore, the topological information can have further data structures attached without further attachments. There are four different types of resource data structures that may be attached to the firmware data structures and they include data structures relating to processor resources, memory resources, buses and cache.

The general rules of connectivity for the firmware data structure as disclosed and described herein pertain to the level of the resource within the data structure. A sibling node is a node sharing a common parent with the current node. The parent of sibling nodes is either another node structure in another layer or the extended system descriptor. All resources that are declared in a given node structure are equally accessible from all other resources in that same node which includes all subnodes. However, when a node contains subnodes, resources in a subnode are implicitly accessible from a resource in the node in a symmetrical fashion, and resources in the node are implicitly accessible from resources in the subnode. All resources in a sibling node are equally accessible from a given node provided a system interconnect exists that connects the two nodes, either directly or indirectly. Accordingly, the latency of accessing different resources within the system is dependent upon their level within the node structure.

The average system interconnect latency table 68 is stored in the extended System descriptor data structure 62. This table maintains information for the average latency between nodes and subnodes. The information in this table 68 emanate from the system interconnect connection table 200. In a preferred embodiment, the latency for accessing resources on different nodes is ascertained from the average latency table as this is the most efficient avenue and generally provides a good approximation of the latency. However, if more accurate latency information is deemed necessary it may be obtained from the system interconnect connection table 200 which stores specific latency information between each node and subnode in the system. Accordingly, latency information may be obtained from either table maintained in the data structure, wherein table access is determined upon the accuracy deemed necessary at a particular level of operation.

Alternative Embodiments

It will be appreciated that, although specific embodiments of the invention have been described herein for purposes of illustration, various modifications may be made without departing from the spirit and scope of the invention. In particular, storing latency between proximity domains in a firmware data structure enables efficient and intelligent decisions for resource allocation. Accordingly, the scope of protection of this invention is limited only by the following claims and their equivalents.

We claim:

1. A computer system, comprising:
   multiple processors;
   a plurality of resources assigned to node groups;
   a first descriptor of respective topological levels of at least one of the resources, said first descriptor including an extended system descriptor;
   said first descriptor having a pointer to a second descriptor of said resources, said second descriptor including a node descriptor referenced in said first descriptor;
   said second descriptor including a node identifying number that identifies a path of interconnectivity of a resource in system topology, and a node number that identifies a node within said topology, said node identifying number and said node number being separate identifiers;
   wherein the first and second descriptors are produced by a same firmware in a single computer system and said firmware is maintained as a data structure.

2. The system of claim 1, wherein said first descriptor is a first level data structure, and said second descriptor is a primary data structure.

3. The system of claim 2, wherein said primary data structure comprises a pointer to a secondary data structure.

4. The system of claim 1, wherein said firmware stores topology information of system resources in a data structure.

5. The system of claim 1, wherein said node identifying number is a string of multiple octets with a value stored in each octet identifying a location of a node.

6. The system of claim 1, further comprising a dynamic updator of at least the first and second descriptors.

7. The system of claim 6, wherein said dynamic updator reflects real-time system configuration into the first descriptor.

8. The system of claim 6, wherein said dynamic updator reflects real-time system performance into the second descriptor.

9. The system of claim 1, wherein said second descriptor includes a pointer to a secondary data structure having a descriptor selected from the group consisting of: processor descriptors, bus descriptors, memory descriptors, and share cache descriptors.

10. The system of claim 9, wherein said shared cache descriptor reflects interconnects of the system.

11. The system of claim 10, wherein said shared cache descriptor reflects latencies of the interconnects.

12. The system of claim 1, wherein said second descriptor reflects average latency between the node groups.

* * * * *